United States Patent

Voss et al.

[11] Patent Number: 4,774,060
[45] Date of Patent: Sep. 27, 1988

[54] EQUIPMENT FOR PURIFYING INDUSTRIAL WASTE GASES

[76] Inventors: Hans Voss, Winsener Str. 111, 2100 Hamburg 90, BRD; Hans-Joachim Voss, Lohberger Str. 55, 2117 Tostedt, BRD; Joachim Möller, Neubertstr. 53, 2000 Hamburg 76, all of Fed. Rep. of Germany

[21] Appl. No.: 910,345

[22] Filed: Sep. 19, 1986

Related U.S. Application Data

[63] Continuation of Ser. No. 680,047, Dec. 10, 1984, abandoned.

[30] Foreign Application Priority Data

Dec. 12, 1983 [DE] Fed. Rep. of Germany ....... 3344875

[51] Int. Cl.⁴ ................................................. F01N 3/08
[52] U.S. Cl. .................................... 422/173; 422/209; 55/247; 261/85; 261/92
[58] Field of Search ............... 422/173, 180, 209, 210; 261/16, 84, 85, 92, 142; 55/91, 92, 247

[56] References Cited

U.S. PATENT DOCUMENTS

| 2,832,666 | 4/1958 | Hertzberg et al. | 422/209 |
| 3,211,148 | 10/1965 | Galajda, Jr. | 261/142 |
| 3,507,479 | 4/1970 | Pearl | 422/209 |

FOREIGN PATENT DOCUMENTS

| 2236389 | 8/1977 | Fed. Rep. of Germany. | |
| 643764 | 1/1979 | U.S.S.R. | 261/84 |

Primary Examiner—Benoit Castel
Attorney, Agent, or Firm—Cushman, Darby & Cushman

[57] ABSTRACT

Equipment for purifying gases comprising a housing having opposing closed end faces and containing wetting fluid which is reactive to impurities in the gas to be purified; a cylinder rotatably mounted within the housing such that the cylinder is mounted between the closed end faces; a plurality of spaced apart plates extending outwardly of the cylinder and extending lengthwise along the cylinder so that as the cylinder rotates the plates are immersed in the wetting fluid and thereafter emerge from the wetting fluid; an air inlet opening for introducing air into the housing provided in one of the end faces such that air is not directed into the wetting fluid and an air outlet opening in the other of the closed end faces through which air exits; a gas inlet opening for introducing the gas to be purified into the housing and a gas outlet for removing the purified gas from the equipment, the gas inlet provided in one of the opposing closes end faces such that the gas to be purified is not directed into the wetting fluid and said gas outlet provided in the other of the closed end faces; and wherein spaced apart plates are positioned and arranged in the housing on the cylinder to define a plurality of chambers, such that when the cylinder rotates when the equipment is operated the relative positions of the air inlet opening, the air outlet opening, the gas inlet opening and the gas outlet opening are such that each chamber (i) is immersed in wetting fluid, (ii) is then in airflow communication with the air inlet and the air outlet and (iii) thereafter is in gas-flow communication with the gas inlet opening and the gas outlet opening.

4 Claims, 1 Drawing Sheet

EQUIPMENT FOR PURIFYING INDUSTRIAL WASTE GASES

RELATED APPLICATIONS

This application is a continuation of U.S. application Ser. No. 680,047 filed Dec. 10, 1984, now abandoned.

FIELD OF THE INVENTION

The present invention relates to a equipment for purifying gases.

BACKGROUND OF THE INVENTION

German Patent Specification No. 2,236,389 discloses a process and equipment for purifying gases. The equipment includes a roll-shaped hollow body with disks which extend transversely to its longitudinal axis over its outer circumference and which are arranged at a mutual distance and dip into a wetting fluid in the lower part of the housing surrounding the roll body and the disks. There are diametrically opposite channels parallel to the longitudinal axis of the roll body which permit introducing and discharging the gas which is to be purified. The gas to be purified flows around the internally heated roll body in the circumferential direction between the disks. During the rotary movement of the half-immersed roll body, solids layers are continuously formed on the disks emerging from the fluid and on the exposed circumferential section of the roll body, which layers react with the substances contained in the gases passed over them. Inevitably, layers of different degrees of drying then come into contact with the gases to be purified so that, even before drying, wet reactions lead to the loss of the layer and hence to interference with the course of the reaction. In many cases, reactive dry layers are then no longer formed, leading to complete failure of the process. The purification of gases which are laden with pollutants and the temperature of which is substantially below the drying temperature of the reaction layer, is not feasible with this known process, because the quantity of heat required for drying the layers must be supplied via the roll body and the disks, which are continuously cooled by the gas flowing past them. A further disadvantage of this known process is that the gas flow paths in the reaction chambers formed between the disks are not variable, so that it is not possible to influence the mono-reactive behavior of a large number of pollutant compounds.

SUMMARY AND OBJECTS OF THE PRESENT INVENTION

The present invention provides equipment for improved purification of gases. Undesired wet reactions with as yet undried layers in prior devices are avoided. Gases can be purified even at low temperatures.

The above objects are achieved in an apparatus for purifying of gases, and particular industrial waste gases, in which the gases are passed through reaction chambers which are continuously renewed and the inner surfaces of which are coated with a thin solids layer. The thin solids layer is formed by immersing these inner surfaces in a wetting fluid and subsequently drying the thin solids layer after immersion. The chemical composition of the solids layer is such that the surface of the solids layer reacts with solid, liquid and preferably gaseous impurities in the gas to be purified to form solid reaction products which are detached, together with the solids layers, after re-immersion in the wetting fluid. The inner surfaces of the reaction chambers are dried by means of hot air after the inner surfaces have exited from the wetting fluid before the gases, which are to be purified, are passed through the reaction chambers.

The fact that after the reaction chamber(s) emerge from the wetting fluid, dried hot air is first passed through the reaction chamber and the gases to be purified are introduced only afterwards, ensures that no undried layer comes into contact with the gases to be purified. In the present invention, the temperature of the gas to be purified has no influence on the drying of the solids layers by the hot air separately fed in.

Advantageous embodiments of the invention are indicated in the claims and in the following description.

BRIEF DESCRIPTION OF THE DRAWINGS

An exemplary embodiment of the invention is explained in more detail below by reference to the drawing in which.

DETAILED DESCRIPTION OF THE PREFERRED EMBODIMENT

Figure 1:
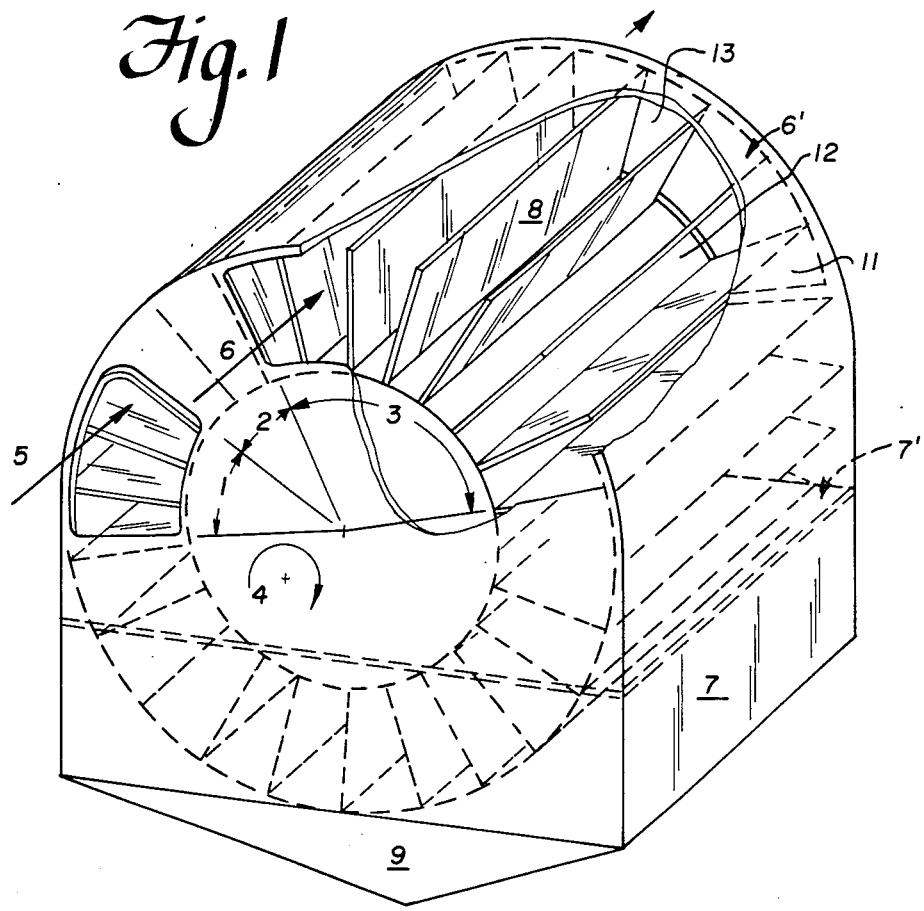
FIG. 1 diagrammatically shows, in a partially broken perspective view, equipment for the purification of gases.

In a housing 11, a hollow cylinder 12 is rotatably mounted. Plates 8 are arranged on the outer periphery of cylinder 12 in such a way that plates 8 extend lengthwise along the axis of the cylinder 12 and outwardly of cylinder 12 in the radial direction. The plates 8 are spaced apart at a small mutual distance in the circumferential direction and form reaction chambers 13 between pairs of spaced apart plates 8 in conjunction with the interposed circumferential section of the cylinder 12 and the housing 11 which tightly encloses the free rim of the plates 8. Housing 11 is barrel-shaped in the upper part. The lower part of the housing 11 contains a layer-forming wetting fluid 7', the level of which is indicated at 7. The hollow cylinder 12 is partially immersed in the wetting fluid 7' and is closed at the end faces to such an extent that no wetting fluid can penetrate into the hollow cylinder. The hollow cylinder 12 rotates in the direction of the arrow 4. In the region of the reaction chambers 8 emerging from the wetting fluid, an air inlet opening 5 is formed on one end face of the housing 11, which opening is associated with a corresponding air outlet opening (not shown) on the opposite end face of the housing 11.

In the illustrative embodiment shown, the air inlet opening 5 extends over the radial dimension of the reaction chambers 13 and over about three reaction chambers in the circumferential direction. As viewed in the circumferential direction, a gas inlet opening 6 is formed at a distance from the air inlet opening 5. The gas inlet opening 6 is likewise associated with a gas outlet opening 6' (not shown) on the opposite end face of the housing 11. The gas inlet and outlet openings likewise extend over the radial height of the reaction chambers 13, but over a larger circumferential section, as indicated by a third section 3 in FIG. 1. The gas inlet opening 6 is arranged at a distance from the air inlet opening 5. Air inlet opening 5 extends of a first section shown, in part, by arrow 1. The distance separating gas inlet opening 6 from air inlet opening 5 corresponds to a second section shown by arrow 2 in FIG. 1. The second section shown by arrow 2 extends, for example, over two reaction chambers 13, as shown in the circumferential direction.

With the equipment in operation, the plates 8 and the outer circumference of the hollow cylinder 12 are moved through the wetting fluid due to the rotary motion in the direction of the arrow 4. The surfaces of plates 8 drain off when emerging from the fluid. In the first section defined by arrow 1, plates 8 pass in front of the air inlet opening 5, through which dry hot air is introduced. The air leaves through an air outlet 5' (not shown) the opposite end face of the housing 11 and, outside the housing 11, is dried and reheated in a closed circulation, before it is re-introduced through the air inlet opening 5. In this way, the layers present on the plates 8 and on the corresponding circumferential sections of the hollow cylinder 12 are completely and thoroughly dried without coming into contact with the gases to be purified. After complete thorough drying, the reaction chambers 13 pass into the second section shown by arrow 2 which separates the dry air stream, introduced through air inlet 5, from the gas stream, introduced through gas inlet 6 and laden with pollutants, and is designed as a sealing section between the two inlet openings 5 and 6. The gas stream entering at 6 in the third section shown by arrow 3 flows through several reaction chambers 13 and, after reaction with the dry layers on the movable inner surfaces of the reaction chambers 13, leaves in a purified state through an opening of the same geometrical shape on the opposite end face of the housing. The inner surfaces, provided with dry layers, of the reaction chambers 13 are then re-immersed in the wetting fluid, with the solids layers having the reaction products being automatically detached. Some of the reaction products can then go into solution in the wetting fluid, or some of them can also settle in the undissolved state, for example as a salt, on the funnel-shaped bottom 9 of the housing 11. An appropriate discharge device, which is not shown, can be provided for the discharge of such undissolved substances.

It is also possible to provide through-flow in the lower part of the housing 11 for continuous or intermittent renewal of the wetting fluid. Such a through-flow of the wetting fluid, preferably in the longitudinal direction of the reaction chambers 13 or the hollow cylinder 12, can promote the detachment of the solids layers, and the wetting fluid can then be purified in a closed circulation outside the housing.

The layer-forming wetting fluid is structured such that the impurities and pollutants contained in the gases are bound to the solid surface layer formed on the movable inner surfaces of the reaction chambers 13 upon contact with such solid layer. The surface layer becomes transformed and exhausted due to the reaction with the particles contained in the gas. Dissolution of the exhausted layer in the wetting fluid is normally initiated readily. In more difficult gases, reagents are added to the wetting fluid, which effect a change in the surface tension of the reacted layer on reimmersion in the wetting fluid, whereby automatic detachment of even those layers is ensured which normally are not readily detached in the untreated wetting fluid. Subsequently, the movable inner surfaces of the reaction chambers 13 are wetted with fresh wetting fluid, whereupon the fluid film thus generated is dried by the hot air stream in order to form a new solid surface layer.

For forming the surface layer, water-soluble compounds are selected which bind the substances contained in the gases to the solid surface layer formed on the plates following wetting.

In addition to the drying of the fluid layer on the movable inner surfaces of the reaction chambers 13 by means of hot air, heating of the hollow cylinder 12 can be provided, in order to assist drying. It is, however, also possible to use the hollow cylinder 12 for cooling. In this way, the process can be carried out at the particular temperature which is most favorable for the course of purification, without special features of the layer drying having to be taken into account. The temperature range of the gases to be purified is provided with a hitherto unattained band width. It is an advantage for carrying out the process, if all those substances are excluded from the wetting fluid which, on evaporation, form a gel with a highly porous structure or a skeleton structure, since the highest reaction rates are reached on extremely smooth layers.

Figure 2:
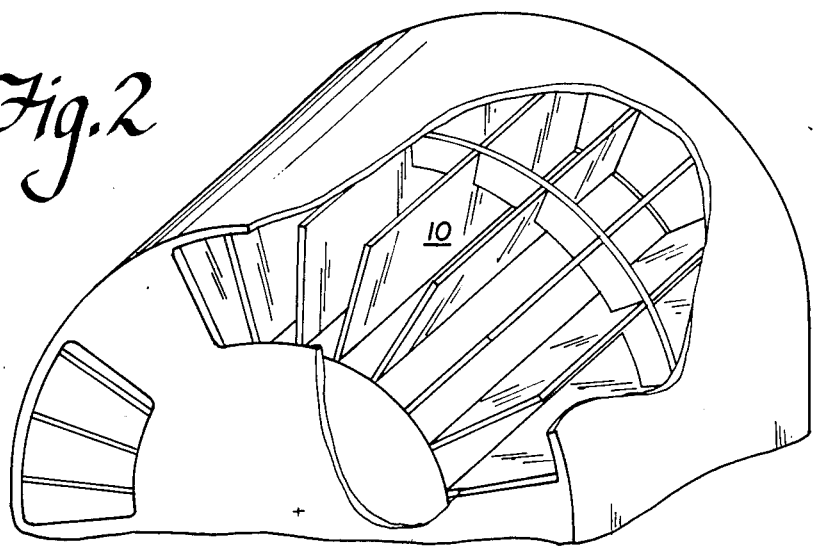
FIG. 2 shows a modified embodiment in the same view.

In order to avoid quasi-laminar flows in the reaction chambers, bulges and/or baffles, such as the baffles 10 extending transversely to the reaction chambers 13 in FIG. 2, are provided, and these result in turbulence of the gas stream and are fixed to the plates 8.

If sequential reactions are envisaged, the gas stream is introduced on the inlet side in the third section shown by arrow 3 over about half of the inlet opening 6 and is passed back in a corresponding manner on the outlet side on the opposite end face through the remaining section of the inlet opening 6. After once passing the contaminated gas with one impurity component through, a reaction product is then formed on the solids layer, which product reacts with a further impurity component in a subsequent reaction chamber in such a way that the latter is also separated out of the gas.

Using the process described and the equipment illustrated, especially industrial wastes gases can be purified, and the purification can be carried out without interruption due to the continuous regeneration of the solids layer.

In place of hot air, a gas, such as, for example, nitrogen, can also be used for drying the reaction chamber emerging from the wetting fluid.

Moreover, it is not necessary to run the drying gas in a closed circulation. It is also possible to provide the housing 11 in the drying zone with openings in the radial direction, so that inflow of drying gas is also possible in the radial direction.

What is claimed is:

1. Equipment for purifying a gas comprising:
    a housing having opposing closed end faces and containing wetting fluid, said wetting fluid being reactive to impurities in the gas to be purified;
    a cylinder rotatably mounted within said housing and between said closed end faces;
    a plurality of spaced apart plates extending outwardly of said cylinder and extending lengthwise along said cylinder so that as said cylinder rotates said plates are immersed in said wetting fluid and thereafter emerge from said wetting fluid;
    an air inlet opening for introducing air into the housing provided in one of said end faces such that air is not directed into the wetting fluid and an air outlet opening in the other of said closed end faces through which air exits; and
    a gas inlet opening for introducing the gas to be purified into the housing and a gas outlet for removing the purified gas from the equipment, said gas inlet provided in said one of said opposing closed end faces such that the gas to be purified is not directed into the wetting fluid and said gas outlet provided in said other of said closed end faces, wherein said spaced apart plates are positioned and arranged in said housing on said cylinder to define a plurality of chambers, such that when said cylinder rotates as the equipment is operated to purify a gas the relative positions of said air inlet opening, said air outlet opening, said gas inlet opening and said gas outlet opening are such that each pair of plates associated with a said chamber are immersed in said wetting fluid, the chamber defined by said pair of plates and said housing is then in air-flow communication with said air inlet and said air outlet and thereafter in gas-flow communication with said gas inlet opening and said gas outlet opening.

2. The equipment according to claim 1, wherein the air inlet opening is smaller in size than the gas inlet opening.

3. The equipment according to claim 1, wherein the distance between the air inlet opening and the gas inlet opening is at least twice the distance between two of said plates bounding one of said chambers.

4. The equipment according to claim 1, wherein said equipment further comprises:

baffle means provided on said plates for causing turbulence in the gas introduced into said housing through said gas inlet opening.

* * * * *